US012482448B2

(12) United States Patent
Debski

(10) Patent No.: US 12,482,448 B2
(45) Date of Patent: Nov. 25, 2025

(54) CANCELLATION OF NOISE OF A WIPER SYSTEM IN A VEHICLE

(71) Applicant: VALEO SYSTEMES D'ESSUYAGE, Le Mesnil Saint Denis (FR)

(72) Inventor: Jacek Debski, Bietigheim-Bissingen (DE)

(73) Assignee: VALEO SYSTEMES D'ESSUYAGE, Le Mesnil Saint Denis (FR)

( * ) Notice: Subject to any disclaimer, the term of this patent is extended or adjusted under 35 U.S.C. 154(b) by 126 days.

(21) Appl. No.: 18/547,297

(22) PCT Filed: Feb. 21, 2022

(86) PCT No.: PCT/EP2022/054284
§ 371 (c)(1),
(2) Date: Aug. 21, 2023

(87) PCT Pub. No.: WO2022/175535
PCT Pub. Date: Aug. 25, 2022

(65) Prior Publication Data
US 2024/0127787 A1   Apr. 18, 2024

(30) Foreign Application Priority Data
Feb. 22, 2021 (FR) .................................. 21 01681

(51) Int. Cl.
*G10K 11/178* (2006.01)
(52) U.S. Cl.
CPC .. *G10K 11/17883* (2018.01); *G10K 11/17873* (2018.01); *G10K 2210/12* (2013.01); *G10K 2210/1282* (2013.01)

(58) Field of Classification Search
CPC ....... G10K 11/17883; G10K 11/17873; G10K 2210/12; G10K 2210/1282
(Continued)

(56) References Cited
U.S. PATENT DOCUMENTS 10,235,987 B1 * 3/2019 Valeri .............. G10K 11/17823
10,672,378 B1   6/2020 Bastyr et al.
(Continued)

FOREIGN PATENT DOCUMENTS

FR       2 906 397 A1       3/2008

OTHER PUBLICATIONS

International Search Report issued May 9, 2022 in PCT/EP2022/054284, filed on Feb. 21, 2022, 4 pages.
(Continued)

*Primary Examiner* — Ivian C Chin
*Assistant Examiner* — Douglas J Suthers
(74) *Attorney, Agent, or Firm* — Oblon, McClelland, Maier & Neustadt, L.L.P.

(57) ABSTRACT

A method of cancelling noise produced in a cabin of a vehicle by a wiper system. The method is implemented by a noise cancellation device and includes receiving feedforward data related to wiper noise. Such feedforward data can be issued from sensors collocated with elements of the wiper system, or from an ECU controlling motor operation of the wiper system. The method further includes generating a noise cancellation control signal based on the feedforward data and based on a model of propagation of the wiper noise in the cabin and transmitting the noise cancellation control signal to a speaker system of the vehicle.

18 Claims, 2 Drawing Sheets

(58) Field of Classification Search
USPC .................................................... 381/73.2
See application file for complete search history.

(56) References Cited

U.S. PATENT DOCUMENTS

| | | |
|---|---|---|
| 2014/0112496 A1 | 4/2014 | Murgia et al. |
| 2014/0114665 A1 | 4/2014 | Murgia |
| 2020/0357378 A1 | 11/2020 | Bastyr et al. |
| 2021/0304728 A1* | 9/2021 | Wang ............... G10K 11/17823 |

OTHER PUBLICATIONS

French Preliminary Search Report issued Oct. 26, 2021 in French Patent Application No. 2101681 (with English translation of Category of cited documents), 3 pages.

* cited by examiner

[Fig. 1]
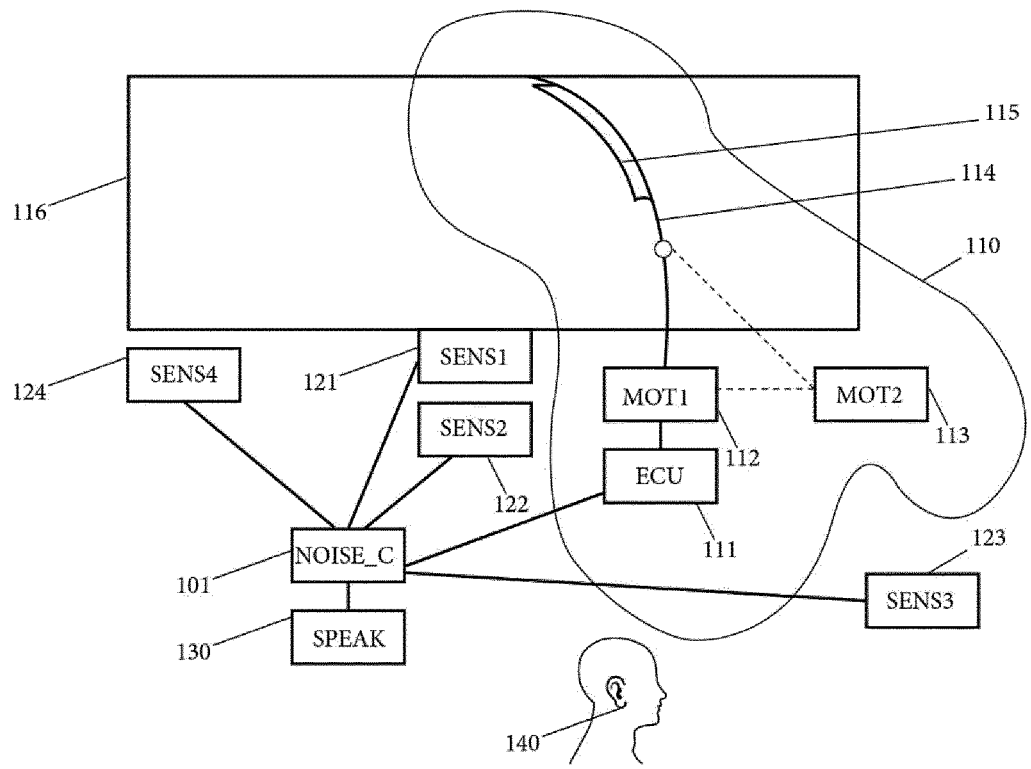
[Fig. 2]
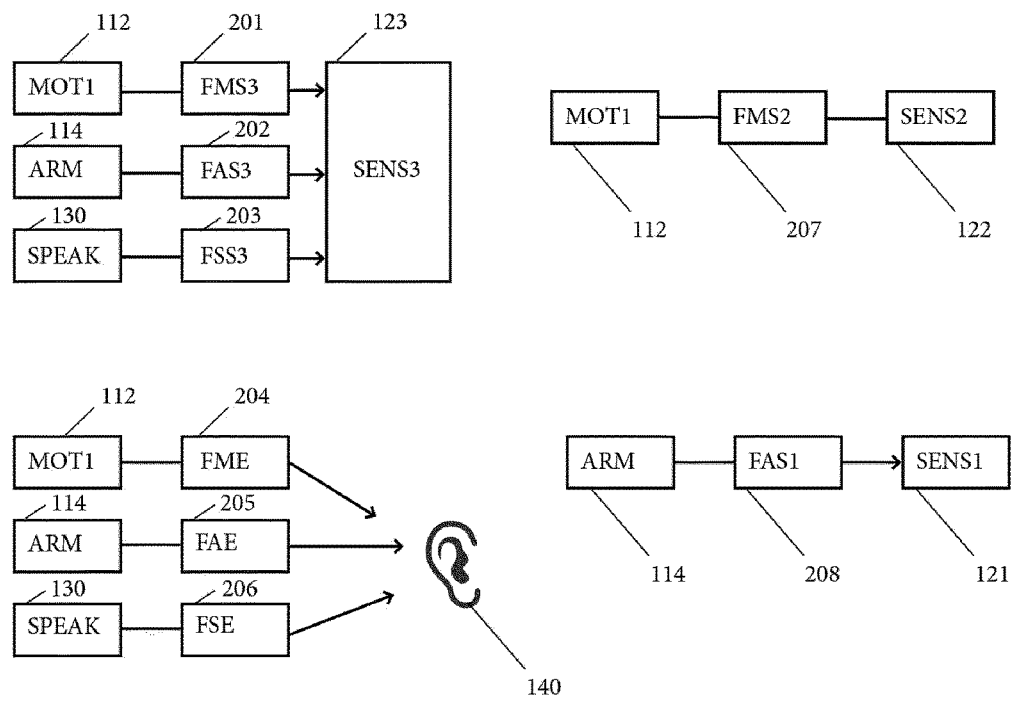

[Fig. 3]
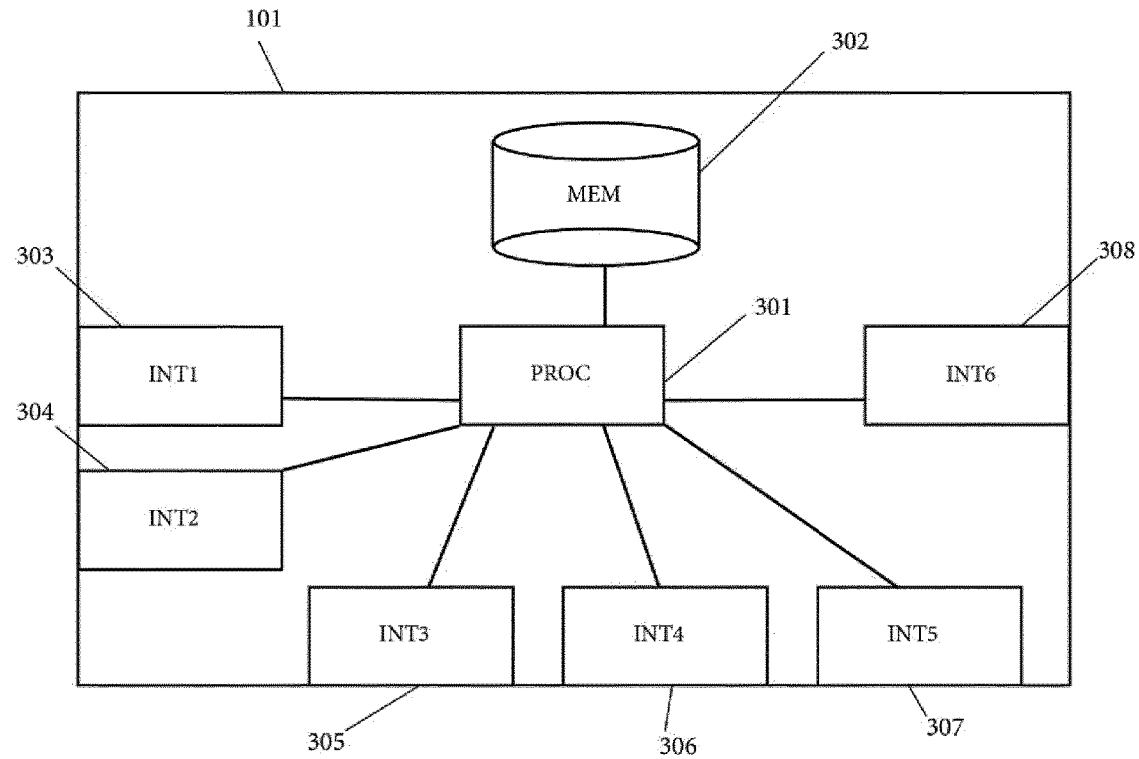
[Fig. 4]
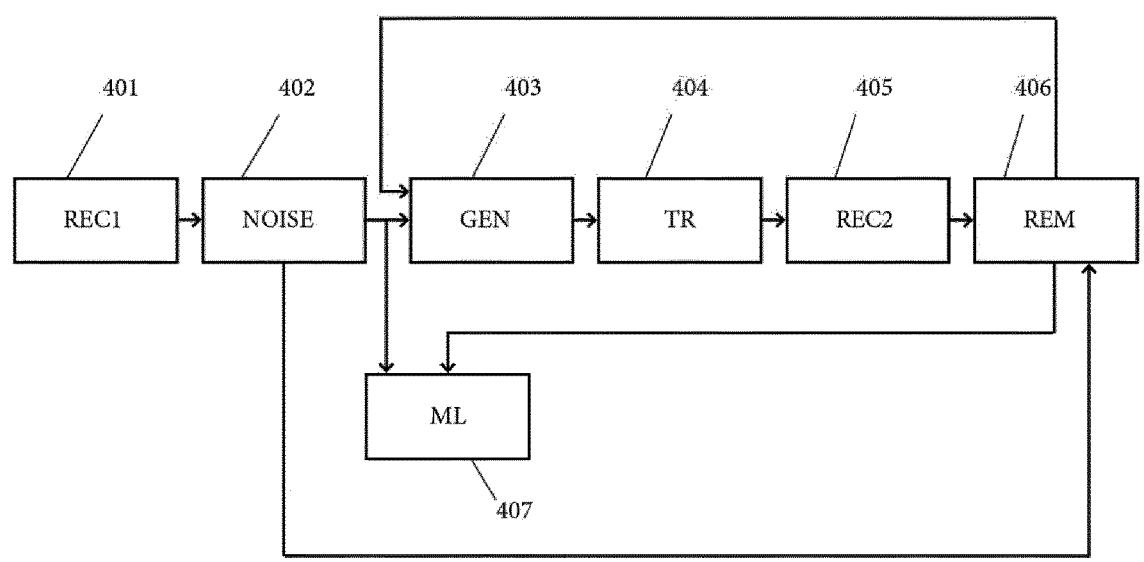

CANCELLATION OF NOISE OF A WIPER SYSTEM IN A VEHICLE

The present invention concerns the technical field of noise cancellation. It concerns in particular, while not exclusively, cancellation of noise produced by a wiper system of a vehicle.

Reduction of wiper noise is subject of intensive research, specifically regarding the use of materials and mechanisms that avoid noise.

However, the materials that are required usually drive up the cost of the wiper system, comprised of a motor, an arm and a blade.

The U.S. Pat. No. 10,235,987 discloses a system for cancelling noise from different sources in a vehicle using a speaker system. However, the system disclosed by the US patent is not particularly adapted to the noise generated by the wiper system, and it lacks accuracy and reactivity.

The present invention improves the situation.

To this end, a first aspect of the invention concerns a method of cancelling noise produced in a cabin of a vehicle by a wiper system, the method being implemented by a noise cancellation device, and comprising:
  receiving feedforward data related to wiper noise;
  generating a noise cancellation control signal based on the feedforward data and based on a model of propagation of the wiper noise in the cabin;
  transmitting the noise cancellation control signal to a speaker system of the vehicle.

Compared to the system of the prior art, the use of feedforward data related to wiper noise allows a better reactivity when detecting the wiper noise, and therefore a better reactivity when generating the noise cancellation control signal. The use of a model of propagation of wiper noise allows for a better accuracy of the noise cancellation control signal. This improvement of reactivity and accuracy is also allowed using a software solution, as most of the existing vehicle comprise sensors that are arranged to acquire data useful for wiper noise cancellation.

According to some embodiments, the wiper system may comprise an arm, a blade and a motor, and an arm noise may be produced by the arm and the blade and a motor noise may be produced by the motor, the wiper noise including the arm noise and/or the motor noise.

In complement, the feedforward data may comprise arm noise data from a sensor collocated with a windscreen of the vehicle, and/or motor noise data from a sensor collocated with the motor.

Using sensors that are collocated with the wiper system allows improving the accuracy of the estimation of the wiper system noise, and therefore the accuracy associated with the noise cancellation control signal. Also, in the case of the reception of feedback data from a sensor located in the cabin, it allows to efficiently discriminate the noise generated by the wiper system from other sources of sounds/noise.

Alternatively or in complement, the feedforward data may comprise data related to an operation of the motor of the wiper system, the data related to the motor operation comprising one or several of the following elements:
  an angular position of the motor;
  an angular speed of the motor;
  an acceleration of the motor;
  a position of the arm;
  an angular speed of the arm;
  an angular acceleration of the arm;
  a reversing point information;
  a PWM information;
  a torque supplied by the motor.

This allows estimating the noise of the wiper system without the need for acoustic sensors collocated with the sensor system, and therefore reduces the costs associated with the method while improving the reactivity associated with the generation of the noise cancellation control signal.

In complement, the noise cancellation device may determine:
  a motor noise based on the data related to motor operation and a model of motor noise, the data related to motor operation comprising at least the PWM information; and/or
  an arm noise based on the data related to motor operation and a model of arm noise, the data related to motor operation comprising an angular acceleration of the arm, an angular speed or the arm and/or a reversing point information.

This allows improving the accuracy associated with the determination of the motor noise and/or arm noise, by taking into account relevant parameters of the motor operation.

According to some embodiments of the invention, the method may be iterative, the noise cancellation device may store at least the model of propagation of the wiper noise in the cabin, and the noise cancellation device may update at least one of the models stored by machine learning based on the feedforward data and/or based on feedback data received from a sensor located in the cabin of the vehicle.

Using machine learning allows:
  improving the accuracy of the generation of the noise cancellation control signal;
  taking into account the aging of the components of the wiper system; and
  avoiding the need to have predetermined models stored in the noise cancellation device According to some embodiments, the method may further comprise receiving feedback data from a sensor located in the cabin of the vehicle, and generation of the noise cancellation control signal may be further based on the received feedback data.

Using feedback data in complement to the feedforward data allows improving the accuracy of the method.

In complement, a remanent noise in a driver's ear may be estimated based on the feedback data and based on the model of propagation of the wiper noise in the cabin, and generation of the noise cancellation control signal may be further based on the remanent noise.

Taking into account a remanent noise reaching driver's ear allows improving the accuracy of the method.

A second aspect of the invention concerns a computer program storage medium, storing instructions for implementing the method according to the first aspect of the invention, when said instructions are executed by a processor.

A third aspect of the invention concerns a noise cancellation device comprising:
  at least one interface arranged for receiving feedforward data related a noise produced by a wiper system of a vehicle comprising the noise cancellation device;
  a memory storing a model of propagation of the wiper noise in the cabin;
  a processor configured to generate a noise cancellation control signal, based on the feedforward data and on the model of propagation of wiper noise in the cabin;
  another interface arranged to transmit the noise cancellation control signal to a speaker system of the vehicle.

Other features and advantages of the invention are made explicit from the description detailed hereafter, and from the attached drawings, on which:

FIG. 1 shows a system for cancelling noise of a wiper system according to some embodiments of the invention;

FIG. 2 shows acoustic transfer functions between the wiper system and sensors, according to some embodiments of the invention;

FIG. 3 shows the structure of a noise cancellation device according to some embodiments of the invention;

FIG. 4 is a flowchart comprising the steps of a method according to some embodiments of the invention.

FIG. 1 shows a system for cancelling noise of a wiper system 110 according to some embodiments of the invention.

The system can be integrated in a vehicle comprising the wiper system 110.

Generally, the wiper system 110 comprises several elements such as:
- a first motor 112;
- a second motor 113, which is optional. When the wiper system comprises the second motor 113, the first motor 112 may be a master motor whereas the second motor 113 is a slave motor;
- an electronic control unit, ECU hereafter, 111 arranged to control the first motor 112 and accessing to data related to the motor operation;
- an arm 114 being moved by the first motor. The arm for example may be rotated around an axis;
- a blade 115 attached to the arm 114 and arranged for sweeping a windscreen 116 of the vehicle.

Together, the arm 114 and the blade 115 form the load of the first motor 112, or of the second motor 113.

Several elements of the wiper system 110 may be responsible for generating noise, which may decrease the driving comfort and/or the driving security of the vehicle. In what follows, the description focuses on the noise generated by the first motor 112, named motor noise hereafter, and on the noise generated by the arm 114 and blade 115 while sweeping the windscreen 116, named arm noise hereafter. However, the invention encompasses compensation of noise produced by other elements of the wiper system 110, such as the second motor 113, or a wiper liquid pump, not shown of FIG. 1.

The ECU 111 accesses to data relating to the motor operation, and in particular to:
- powering information of the first motor 112, such as PWM information. PWM information may comprise a frequency of the motor and/or a duty cycle. Powering information may also comprise a voltage or current level of a power source or of a drive powering the first motor 112. The same information may be accessed by the ECU 111 for the second motor 113;
- an angular position or angular speed of the first motor 112. The same information may be accessed for the second motor 113;
- a position of the arm 115 driven by the first motor 112. The same information may be accessed when the arm 115 is driven by the second motor 113;
- a reversing point information. The reversing point corresponds to an extreme position reached by the arm. The trajectory of the arm 115 therefore comprises two reversing points and the ECU may detect when one of the reversing point is reached by the arm 115;
- a torque supplied by the first motor 113, and/or
- based on the above torque, the ECU may also access to information related to the surface of the windscreen such as the presence of snow, rain or dust, as it impacts on the torque applied to the load.

The noise cancellation system according to the invention comprises a noise cancellation device 101. The noise cancellation device 101 is arranged for receiving information from the ECU 111, and/or from one or several of the following sensors:
- a first sensor 121 collocated with the wiper system, and in particular collocated with the arm 114 and blade 115, for example with the windscreen 116. The first sensor 121 is arranged for recording data related to an acoustic noise produced by the arm 114 and blade 115, in particular due to the contact between the blade 115 and the windscreen 116. To this end, the first sensor 121 may be a microphone, or a vibration sensor, such as a piezoelectric system, arranged to detect vibration of the windscreen 116. More generally, the first sensor 121 encompasses any technology that is able to detect, directly or indirectly, inside or outside the cabin, the acoustic noise produced by the arm 114 and blade 115;
- a second sensor 122 collocated with the wiper system 110, and in particular collocated with the first motor 112. The second sensor 122 is arranged for recording data related to an acoustic noise produced by the first motor 112. To this end, the second sensor 122 may be a microphone in the vicinity of the first motor 112, or can be a vibration sensor arranged to detect vibrations of the first motor 112. An additional sensor may be collocated with the second motor 113 and arranged for recording data related to an acoustic noise produced by the second motor 113;
- a third sensor 123, located in the cabin of the vehicle where the driver is sitting and arranged to detect noises and sounds propagated in the cabin of the vehicle. To this end, the third sensor 123 may be a cabin microphone or a cabin array of microphones;
- a fourth sensor 124, arranged for detecting environmental data. Environmental data may encompass a speed of the vehicle, which can be directly measured by a speed sensor, or indirectly based on an input power of the motor of the vehicle. Alternatively or in complement, environmental data may encompass meteorological data such as rain detection data or snow detection data. Still alternatively or in complement, environmental data may encompass dirt indication data, representative of the presence of dirt. To detect dirt indication data, the fourth sensor 124 may be a front camera mounted in the vehicle and directed towards the road in front of the vehicle, through the windscreen 116, for example;

An ear 140 of the driver is also represented on FIG. 1, which can be assimilated to a microphone arranged for detecting sounds and noises at a given spatial location of the cabin where ear is located.

The noise cancellation device 101 is further configured to generate a noise cancellation control signal and to transmit the noise cancellation control signal to a speaker system 130 of the vehicle. No restriction is attached to the technology of the speaker system 130, to the number of speakers it comprises and to the respective locations of the speakers in the vehicle.

Based on the noise cancellation control signal, the speaker system 130 is configured to broadcast a noise cancellation acoustic signal in the cabin of the vehicle. It is to be noted that the speaker system 130 may output other sounds in addition to the noise cancellation acoustic signal. For example, the speaker system 130 may output music or GPS vocal assistance. No restriction is attached to the sounds output in addition to the noise cancellation acoustic signal according to the invention.

The noise cancelation acoustic signal allows to compensate for the noise generated by the first motor 112 and/or by the arm 114 and blade 115, as it will be further explained.

FIG. 2 shows acoustic transfer functions between the wiper system and sensors, according to some embodiments of the invention.

As it is well known, acoustic transfer functions depend on the location of the acoustic source, the location of the receiver, and of the acoustic channel through which the noise/sound reaches the receiver after being produced by the source.

Considering a first receiver as the third sensor 123, located in the vehicle cabin, three acoustic transfer functions are considered, for three different acoustic sources.

A first acoustic source is the first motor 112, which produces noise during operation. A first acoustic function 201 is defined by the relationship between the motor noise as produced by the first motor 112 and the motor noise as received by the third sensor 123.

A second acoustic source is the arm 114 and blade 115, which produces noise, in particular because of the contact with the windscreen 116. A second acoustic function 202 is defined by the relationship between the arm noise as produced by the arm 114 and blade 115 and the arm noise as received by the third sensor 123. It is to be noted that the second acoustic source is moving periodically, so that the second acoustic function 202 is more accurately described when it is considered as periodically varying.

A third acoustic source is the speaker system 130 outputting the noise cancellation acoustic signal according to the invention. As explained above, the speaker 130 may simultaneously output other sounds in addition to the noise cancellation acoustic signal. A third acoustic function 203 is defined by the relationship between the acoustic signal output by the speaker system 130 and the corresponding acoustic signal as received by the third sensor 123. As explained above, the speaker system 130 may comprise several speakers. In that case, each speaker is associated with a given third acoustic function representative of the relationship between the acoustic signal output by the specific speaker and the corresponding acoustic signal as received by the third sensor 123.

As explained above, the third sensor 123 may be an array of sensors, in which case, three acoustic transfer functions are defined for each of the sensors of the array. When the speaker system 130 comprises several speakers, 2+n acoustic transfer functions are defined for each of the sensors of the array, where n is the number of speakers of the speaker system 130.

The first, second and third acoustic transfer functions depend on the shape of the cabin, on the respective positions of the sources, on the position of the third sensor 123, of the materials of the cabin and on other factors. According to some embodiments of the invention, the acoustic transfer functions are predetermined, for example by the vehicle manufacturer, and stored in a memory, such as the memory of the noise cancellation device 101 discussed hereafter. Alternatively, the first, second and third acoustic transfer functions may be determined based on a model of propagation of the wiper system noise inside the cabin and on a model of the propagation of the noise cancellation acoustic signal output by the speaker system 130 inside the cabin. Two distinct models may be used for the wiper noise propagation, one for the motor noise propagation and another for the arm noise propagation. These models may be predetermined, or may be determined using machine learning. Machine learning implies to train the models based on real acoustic signals issued by the three sources and received by the third sensor 123. These models allow to infer sounds and noises reaching the driver's ear 140 based on acoustic signals received by the third sensor 123. These models may be stored in the memory of the noise cancellation device 101 as well.

An acoustic model according to the invention encompasses both explicit models, comprising a series of parameters stored in memory, but also implicit models such as models built exclusively by machine learning. For example, the second acoustic transfer function may be determined by machine learning based on the position of the arm 114 obtained from the ECU 111 and based on the data acquired by the third sensor 123. In that case, the model of arm noise determined based on this data is implicit.

When the first, second and third functions are known, it is possible for the noise cancellation device 101 to estimate the motor noise, the arm noise and/or the noise cancellation acoustic signal as produced by their respective sources, based on the acoustic signals received the third sensor 123. This information may also be used as feedback information to improve the accuracy associated with the generation of the noise cancellation control signal by the noise cancellation device 101, as it will be further explained in what follows.

Considering now a second receiver being the ear 140 of the driver, located in the vehicle cabin, another series of three acoustic transfer functions is considered, for the three different acoustic sources.

The first acoustic source in the first motor 112, which produces noise during operation. A fourth acoustic function 204 is defined by the relationship between the motor noise as produced by the first motor 112, and the motor noise as received by the driver's ear 140.

The second acoustic source is the arm 114 and blade 115. A fifth acoustic function 205 is defined by the relationship between the arm noise as produced by the arm 114 and blade 115 and the arm noise as received by the driver's ear 140. As per the second acoustic transfer function, it is to be noted that the second acoustic source is moving periodically, so that the fifth acoustic function 205 is more accurately described when it is considered as periodically varying.

The third acoustic source is the speaker system 130 outputting the noise cancellation acoustic signal according to the invention. A sixth acoustic function 206 is defined by the relationship between the acoustic signal output by the speaker system 130 and the corresponding acoustic signal as received by the driver's ear 140. As explained above, the speaker system 130 may comprise several speakers. In that case, each speaker is associated with a given sixth acoustic function representative of the relationship between the acoustic signal output by the specific speaker and the corresponding acoustic signal as received by the driver's ear 140.

The fourth, fifth and sixth acoustic functions may be predetermined, for example by the vehicle manufacturer and stored in a memory, such as the memory of the noise cancellation device 101 discussed hereafter. The fourth, fifth and sixth acoustic functions may also be derived from the first, second and third acoustic functions, based on models of propagations of the sound in the cabin of the vehicle. These models may be predetermined or may be obtained using machine learning. Then, the acoustic signals received by the third sensor 123, may be used to calculate the acoustic signals received by the driver's ear, and to calculate a remanent noise, which can be used as a feedback information by the noise cancellation device 101 to improve the calculation of the noise cancellation control signal transmitted to the speaker system 130. As explained above, the models of propagation of noise in the cabin may be explicit or implicit.

The target of the noise cancellation device 101 according to the invention is indeed to precisely and quickly calculate and generate a noise cancellation acoustic signal that can cancel the motor noise and/or the arm noise, when reaching the driver's ear 140. To this end, the noise cancellation acoustic signal is to be similar to the motor noise and/or the arm noise in terms of frequency spectrum and intensity, but with an opposite phase.

Considering now a third receiver being the second sensor 122, the acoustic source is the first motor 112, because the second sensor 122 is dedicated to it and collocated with it. A seventh acoustic transfer function 207 is defined by the relationship between the motor noise produced by the first motor 112 and the motor noise as received by the second sensor 122.

The seventh acoustic transfer function 207 may be predetermined, such as determined in advance by the vehicle maker, and stored in the memory of the noise cancellation device 101. The seventh acoustic transfer function 207 is relatively simple as the second sensor 122 is collocated with the first motor 112.

The seventh acoustic transfer function 207 allows estimating the motor noise produced by the first motor. This information can be used by the noise cancellation device 101 to improve the calculation of the noise cancellation control signal.

Considering now a fourth receiver being the first sensor 121, the acoustic source is the arm 114 and blade 115, because the first sensor 121 is dedicated to them and collocated with them. An eighth acoustic transfer function 208 is defined by the relationship between the arm noise produced by the arm 114 and blade 115 and the arm noise as received by the first sensor 121.

The eighth acoustic transfer function may be predetermined, such as determined in advance by the vehicle maker, and stored in the memory of the noise cancellation device 101. It is relatively simple to calculate as the first sensor 121 is collocated with the arm 114 and blade 115.

The eighth acoustic transfer function allows estimating the arm noise produced by the arm 114 and blade 115. This information can be used by the noise cancellation device 101 to improve the calculation of the noise cancellation control signal.

Therefore, acoustic signals issued from the first sensor 122 and/or from the second sensor 121 may be used as feedforward data by the noise cancellation device 101 to enhance the reactivity associated with the generation of the noise cancellation control signal.

In addition, the acoustic signals obtained by the first sensor 121 and/or by the second sensor 122, may be used by the noise cancellation device 101 to discriminate between the arm noise, the motor noise and the noise cancellation acoustic signal in the acoustic signal received from the third sensor 123 located in the cabin. Indeed, the first sensor 121 may indicate which frequency or frequency spectrum corresponds to the motor noise whereas the second sensor 122 may indicate which frequency or frequency spectrum corresponds to the arm noise.

Therefore using in combination the feedback data from the third sensor 123 and the feedforward data from the first sensor 121 and/or from the second sensor 122, allows to improve both the accuracy and the reactivity of the generation of the noise cancellation control signal by the noise cancellation device 101.

An alternative to using the data collected by the first sensor 121 and/or the second sensor 122 as feedforward data, can be to use the data related to the motor operation from the ECU 111 as feedforward data, and:

an arm noise model of the arm noise, which can be predetermined or which can be determined by machine learning. The arm noise model allows evaluating the arm noise based on data related to the motor operation from the ECU 111, which has been listed previously. It is to be noted that arm noise strongly depends on position, speed and acceleration of the arm 114, and therefore, an arm noise model taking into account this data improves the accuracy associated with estimating the arm noise. The arm noise model may be stored in the memory of the noise cancellation device 101, and it may be trained based on acoustic signals acquired by the first sensor 121, and optionally based on the feedback data from the third sensor 123. Alternatively, the arm noise model may be built by machine learning based on the feedback data from the third sensor 123 and based on data from the ECU 111, only, without receiving data from the first sensor 121; and/or a motor noise model of the motor noise, which can be predetermined or which can be determined by machine learning. The motor noise model allows evaluating the motor noise based on data relating to the motor operation from the ECU 111, which has been listed previously. In particular, the PWM information is particularly relevant for estimating the motor noise. Therefore, a motor noise model taking into account the PWM information improves the accuracy associated with estimating the motor noise. The motor noise model may be stored in the memory of the noise cancellation device 101, and it may be trained based on acoustic signals acquired by the second sensor 122, and optionally based on the feedback data from the third sensor 123. Alternatively, the motor noise model may be built by machine learning based on the feedback data from the third sensor 123 and based on data from the ECU 111, only, without receiving data from the second sensor 122.

Therefore, another advantageous combination according to the invention is to use the feedback data from the third sensor 123 and the feedforward data from the ECU 111. Feedforward data from the ECU 111 corresponds to the data related to the motor operation, which, in combination with an arm noise model and/or a motor noise model, allows estimating the noise produced by the arm and/or the motor. In particular, the PWM information allows identifying the frequency spectrum of the motor noise, and therefore to identify the motor noise in the feedback acoustic signal received from the third sensor 123.

In this embodiment, the first and second sensors 121 and 122 are not required, which is advantageous as it allows for implementing the solution purely in software, as most of the vehicles already comprise a cabin sensor such as the third sensor 123 and a driving unit for the wiper system such as the ECU 111, that is able to provide feedforward data. When the third sensor 123 is a cabin microphone array, it may also isolate the arm noise based on a phase analysis performed on the microphone array, preferentially when the microphone array is arranged in a three dimensional space of the cabin. The third sensor 123 may in that case encompass the role of the first sensor 121, which is to detect the arm noise. Alternatively, the third sensor is a single microphone in the cabin, and the noise cancellation device 101 generates the noise cancellation control signal based on the data from the third sensor 123 and on the feedforward data from the ECU 111.

FIG. 3 shows a structure of a noise cancellation device 101 according to some embodiments of the invention.

The noise cancellation device 101 comprises a processor 301 and a memory 302. The memory may for example store instructions for performing the steps of a method as described hereafter in reference to FIG. 4, when the instructions are executed by the processor 301.

The memory 302 may also store one or several of the above mentioned models and transfer functions, which are listed again hereafter:
the first to eighth transfer functions;
the model of propagation of the arm noise in the cabin. This model may take into account the position of the arm, which is changing. Indeed, the position of the arm varies periodically as it is sweeping the windscreen 116. The position of the arm can be accessed via the ECU 111. The position can for example be an angle, that can be accessed via the ECU 111, and the model of propagation of the arm noise in the cabin depends on said angle. The model of propagation of the arm noise in the cabin may also take into account an angular speed and an acceleration of said arm;
the model of propagation of the motor noise in the cabin;
the model of propagation of the sound produced by the speaker system 130 in the cabin;
the model of arm noise to estimate the arm noise based on the data related to motor operation; and
the model of motor noise to estimate the motor noise based on the data related to motor operation;
a usage model representative of the aging of a component of the vehicle, for example of a component of the wiper system, such as the arm 114, the blade 115, the first motor 112 and/or the ECU 111. The usage model may be trained continuously by machine learning during the lifecycle of the vehicle, and may be used to update the other models. For example, aging of the blade 115 may influence the model of arm noise, and the model of arm noise may be updated based on the usage model.

As explained above, all these models and transfer functions may be predetermined and fixed, or may be continuously updated and improved using machine learning. In particular, the model of motor noise cited above may be continuously trained based on machine learning, in particular to optimize determination of the motor noise based on the PWM information.

The noise cancellation device 101 may further comprise:
a first interface 303 arranged to communicate with the first sensor 121;
a second interface 304 arranged to communicate with the second sensor 122;
a third interface 305 arranged to communicate with the third sensor 123;
a fourth interface 306 arranged to communicate with the fourth sensor 124;
a fifth interface 307 arranged to communicate with the ECU 111;
a sixth interface 308 arranged to communicate with the speaker system 130, in particular to transmit the noise cancellation control signal generated by the processor 301, based on data received on the other interfaces.

It is to be understood that the noise cancellation device 101 does not necessarily comprise the six above interfaces according to the invention. In particular, the invention encompasses embodiments where:
the noise cancellation device 101 cancels the motor noise only. In that case, the noise cancellation device 101 may not comprise the first interface 303;
the noise cancellation device 101 cancels the arm noise only. In that case, the noise cancellation device may not comprise the second interface 304;
the noise cancellation device 101 only uses feedforward data to determine the noise cancellation control signal. In that case, the noise cancellation device 101 may not comprise the third interface 305;
the noise cancellation device 101 only uses feedforward data from the ECU 111 to determine the noise cancellation control signal. In that case, the noise cancellation device 101 may not comprise the first to fourth interfaces;
the noise cancellation device 101 only uses feedforward data from the first sensor 121 and/or from the second sensor 122 to generate the noise cancellation control signal. In that case, the noise cancellation device 101 may not comprise the third interface 305 and the fifth interface 307;
the noise cancellation device 101 uses other combinations of data, which do not require all the first to sixth interfaces.

FIG. 4 is a flowchart showing the steps of a method according to some embodiments of the invention.

All the steps of the method according to the invention may be performed by the noise cancellation device 101.

At a step 401, the noise cancellation device 101 receives feedforward data related to the noise produced by the wiper system, such as feedforward data:
from the first sensor 121 relating to the arm noise;
from the second sensor 122 relating to the motor noise;
from the fourth sensor 124 relating to environmental data; and/or
from the ECU 111 relating to the motor operation.

At a step 402, the noise cancellation device 101 determines the wiper noise based on the feedforward data related to the wiper noise. As explained above, the wiper noise may comprise an arm noise and/or a motor noise.

When the feedforward data comes from the first sensor 121 and/or the second sensor 122, the wiper noise is estimated based on the feedforward data directly, for example based on the seventh and eighth acoustic transfer function stored in memory 302.

When the feedforward data comes from the ECU 111, the wiper noise is estimated by applying a model of arm noise or a model of motor noise to the data related to motor operation.

Determination of the wiper noise also allows identifying the frequency spectrum associated with the arm noise and/or the motor noise, which can then be used to differentiate between the different noises and sounds in the feedback data from the third sensor 123 located in the cabin. It is indeed important to discriminate the wiper system noises, that are to be cancelled based on the noise cancellation acoustic signal, from other sounds or noises that are in the cabin. For example, there may be other sources of noises than the wiper system and the speaker system 130, such as the driver or a passenger talking, the vehicle motor, or other noises/sounds that are internal or external to the vehicle. In some cases, it is crucial for security reasons not to cancel the noises from sources other than the wiper system, for example in the case of an alarm or a police siren. The feedforward data is therefore advantageously used according to the invention to determine which part of the data acquired by the third sensor 123 corresponds to the wiper system or not.

At step 403, the noise cancellation device 101 generates the noise cancellation control signal based on the feedforward data received at step 402, and based at least on a model of propagation of the wiper noise in the cabin, such as the model of propagation of the arm noise and/or the model of propagation of the motor noise in the cabin. Compared to the system of the prior art, the feedforward data allows a better reactivity when detecting the motor noise and/or the arm noise, and the model of propagation of wiper noise allows for a better accuracy of the noise cancellation control signal. The noise cancellation device 101 may also take into account the other models and/or transfer functions, which allows more accuracy in the generation of the noise cancellation control signal.

Step 403 may take into account other feedback data from step 406 as discussed hereafter, which allows to improve the accuracy of the generation of the noise cancellation control signal.

At step 404, the noise cancellation control signal generated at step 403, is transmitted to the speaker system 130 through the sixth interface 308, so that the speaker system outputs a noise cancellation acoustic signal based on the noise cancellation control signal.

At step 405, the noise cancellation device 101 receives feedback data from the third sensor 123. Based on the feedback data, the noise cancellation device 101 may discriminate between the different sources of sounds/noises and may isolate the motor noise, the arm noise and/or the noise cancellation acoustic signal issued by the speaker system 130. The feedback data may also comprise other sources of noise/sounds, such as a passenger speaking, music playing, and so on. The noise cancellation device 101 is configured to differentiate between the three sources 112, 114 and 130 and the other acoustic sources that are not relevant for the generation of the noise cancellation control signal.

Based on the feedback data, the noise cancellation system may identify at step 406 a remanent noise in the driver's ear 140, based on the model of propagation of the arm noise in the cabin or based on the first to sixth acoustic transfer functions, and adapts the generation of the noise cancellation control signal accordingly in a feedback loop.

As discussed above, the models that are stored and used by the noise cancellation device 101 may be fixed, or may be continuously trained based on the data issued from steps 402 and 406, using machine learning. This allows a better accuracy when generating the noise cancellation control signal. The machine learning step 407 is based on the output of steps 402 and 406 described above.

The present invention is not limited to the embodiments described above as examples: it extends to other embodiments as defined by the claims.

The invention claimed is:

1. A method of cancelling noise produced in a cabin of a vehicle by a wiper system, said method being implemented by a noise cancellation device, and comprising:
   receiving feedforward data related to wiper noise;
   generating a noise cancellation control signal based on the feedforward data and based on a model of propagation of the wiper noise in the cabin; and
   transmitting the noise cancellation control signal to a speaker system of the vehicle, wherein the method is iterated, wherein the noise cancellation device stores at least the model of propagation of the wiper noise in the cabin, and wherein the noise cancellation device updates at least one of the models stored by machine learning based on the feedforward data and/or based on feedback data received from a sensor located in the cabin of the vehicle.

2. The method according to claim 1, wherein the wiper system comprises an arm, a blade and a motor, and wherein an arm noise is produced by the arm and the blade and a motor noise is produced by the motor, the wiper noise including the arm noise and/or the motor noise.

3. The method according to claim 2, wherein the feedforward data comprises arm noise data from a sensor collocated with a windscreen of the vehicle, and/or motor noise data from a sensor collocated with the motor.

4. The method according to claim 2, wherein the feedforward data comprises data related to an operation of the motor of the wiper system, said data related to the motor operation comprising a pulse width modulation (PWM) information.

5. The method according to claim 4, wherein the noise cancellation device determines:
   a motor noise based on the data related to motor operation and a model of motor noise, the data related to motor operation comprising at least the PWM information; and/or
   an arm noise based on the data related to motor operation and a model of arm noise, the data related to motor operation comprising an angular acceleration of the arm, an angular speed or the arm and/or a reversing point information.

6. The method according to claim 2, wherein the feedforward data comprises data related to an operation of the motor of the wiper system, said data related to the motor operation comprising one or several of the following elements:
   an angular position of the motor;
   an angular speed of the motor;
   an acceleration of the motor;
   a position of the arm;
   an angular speed of the arm;
   an angular acceleration of the arm;
   a reversing point information;
   a pulse width modulation (PWM) information;
   a torque supplied by the motor.

7. A non-transitory computer-readable storage medium, storing instructions for implementing the method according to claim 2, when said instructions are executed by a processor.

8. The method according to claim 1, further comprising receiving feedback data from a sensor located in the cabin of the vehicle, and generation of the noise cancellation control signal is further based on the received feedback data.

9. The method according to claim 1, wherein a remanent noise in a driver's ear is estimated based on the feedback data and based on the model of propagation of the wiper noise in the cabin, and wherein generation of the noise cancellation control signal is further based on the remanent noise.

10. The method according to claim 1, wherein a remanent noise in a driver's ear is estimated based on the feedback data and based on the model of propagation of the wiper noise in the cabin, and wherein generation of the noise cancellation control signal is further based on the remanent noise.

11. A computer-program non-transitory computer-readable storage medium, storing instructions for implementing the method according to claim 1 when said instructions are executed by a processor.

12. A noise cancellation device comprising:
- at least one interface arranged for receiving feedforward data related a noise produced by a wiper system of a vehicle comprising the noise cancellation device;
- a memory storing a model of propagation of the wiper noise in the cabin;
- a processor configured to generate a noise cancellation control signal, based on the feedforward data and on the model of propagation of wiper noise in the cabin;
- another interface arranged to transmit the noise cancellation control signal to a speaker system of the vehicle, wherein the receiving, generating, and transmitting are iterated, and wherein the processor is configured to update the models stored in the memory by machine learning based on the feedforward data and/or based on feedback data received from a sensor located in the cabin of the vehicle.

13. The device of claim 12, wherein the processor is configured to generate a noise cancellation control signal configured to at least partially cancel an arm noise produced by an arm or blade of the wiper system, and/or a motor noise produced by a motor of the wiper system.

14. The device according to claim 1, wherein the feedforward data comprises data related to an operation of the motor of the wiper system, said data related to the motor operation comprising a pulse width modulation (PWM) information.

15. The device according to claim 1, wherein the feedforward data comprises data related to an operation of the motor of the wiper system, said data related to the motor operation comprising one or several of the following elements:
- an angular position of the motor;
- an angular speed of the motor;
- an acceleration of the motor;
- a position of the arm;
- an angular speed of the arm;
- an angular acceleration of the arm;
- a reversing point information;
- a pulse width modulation (PWM) information;
- a torque supplied by the motor.

16. The device according to claim 1, wherein the processor is configured to determine:
- noise of the motor based on the data related to motor operation and a model of motor noise, the data related to motor operation comprising at least the pulse width modulation (PWM) information; and/or
- noise of the arm based on the data related to motor operation and a model of arm noise, the data related to motor operation comprising an angular acceleration of the arm, an angular speed or the arm and/or a reversing point information.

17. The device according to claim 12, wherein the feedforward data comprises arm noise data from a sensor collocated with a windscreen of the vehicle, and/or motor noise data from a sensor collocated with the motor.

18. The device according to claim 12, wherein the processor is further configured to generate the noise cancellation control signal based on the received feedback data.

* * * * *